G. R. STRICKLAND.
CONVEYER FOR HARVESTING MACHINES.
APPLICATION FILED APR. 13, 1914.
1,152,572.
Patented Sept. 7, 1915.
2 SHEETS—SHEET 1.
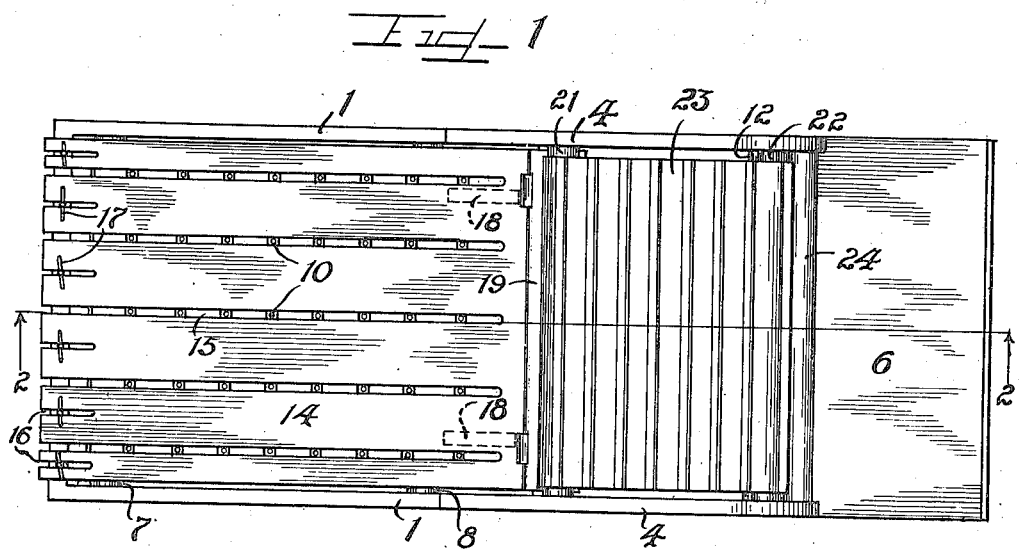
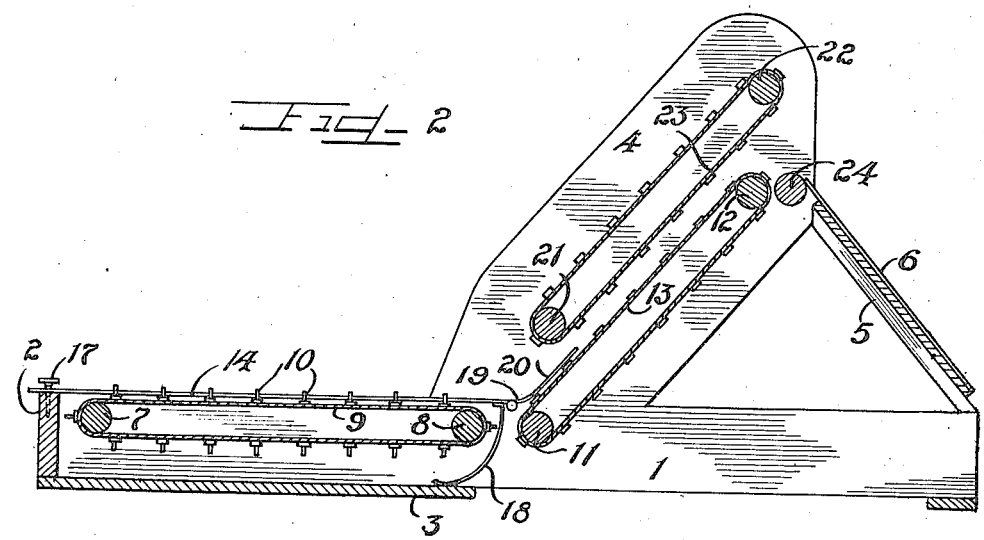
Witnesses
Victor Siljander.
Inventor
George R. Strickland
Atty

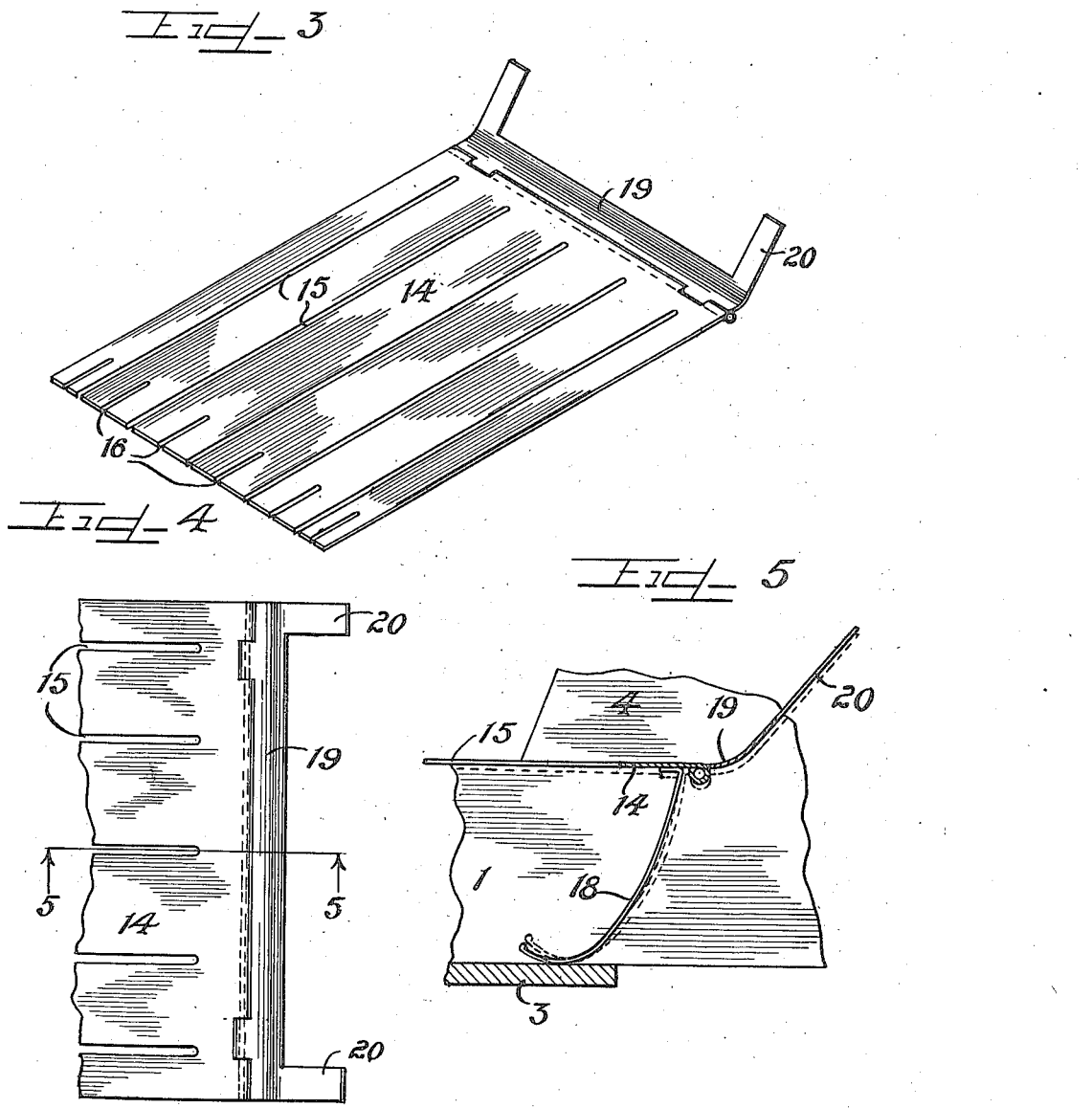

UNITED STATES PATENT OFFICE.

GEORGE R. STRICKLAND, OF CHICAGO, ILLINOIS, ASSIGNOR OF ONE-HALF TO W. W. WAGG, OF MOOSE JAW, SASKATCHEWAN, CANADA.

CONVEYER FOR HARVESTING-MACHINES.

1,152,572.      Specification of Letters Patent.      Patented Sept. 7, 1915.

Application filed April 13, 1914. Serial No. 831,388.

*To all whom it may concern:*

Be it known that I, GEORGE R. STRICKLAND, a citizen of the United States, and a resident of the city of Chicago, county of Cook, and State of Illinois, have invented certain new and useful Improvements in Conveyers for Harvesting-Machines; and I do hereby declare that the following is a full, clear, and exact description of the same, reference being had to the accompanying drawings, and to the numerals of reference marked thereon, which form a part of this specification.

The conveying and elevating mechanisms heretofore constructed for use with harvesting machines or binders have been more or less inefficient in operation, due to the loss of material sustained between the conveying and elevating mechanisms.

This invention relates to a conveying and elevating mechanism associated with supporting means for the material to be handled such that loss of the material in its passage from the conveying to the elevating mechanisms is obviated.

In the present invention the supporting means hereinbefore referred to is of a nature enabling the same to be readily attached to the usual conveying and elevating mechanisms on a binder for use therewith without modifications.

It is an object of this invention to construct a device wherein conveying and elevating mechanisms are associated with a stationary resiliently mounted support bridging the gap between the conveying and elevating mechanisms to prevent the loss therebetween of material handled, and acting to yield in the event of a surplus quantity of the material becoming jammed in its passage from the conveying to the elevating mechanism, permitting the operation to proceed until normal conditions are reëstablished.

It is also an object of this invention to construct a device wherein a supporting apron is releasably clamped at one of its ends and is resiliently supported at its other to co-act with the conveying and elevating mechanisms leading to the binder of a harvesting machine to prevent loss and damage occurring to the material handled by the mechanisms.

It is furthermore an object of this invention to construct a device wherein means are provided to support the material handled between a conveying and elevating mechanism in a yieldable manner such that a surplus quantity of the material cannot become jammed and prevent the operation from proceeding, and wherein said means acts to prevent loss of the material in its passage from the conveying to the elevating mechanism.

It is finally an object of this invention to construct a device wherein releasably attached resiliently mounted supporting means is associated with the conveying and elevating mechanisms to efficiently co-act therewith in handling material, preventing loss or damage occurring to the same.

The invention (in a preferred form) is illustrated in the drawings and hereinafter more fully described.

In the drawings: Figure 1 is a top plan view of a device embodying the principles of my invention. Fig. 2 is a longitudinal central vertical section taken on line 2—2 of Fig. 1. Fig. 3 is a perspective detail view of the resiliently mounted releasably attached supporting apron. Fig. 4 is a fragmentary top plan view of one end thereof. Fig. 5 is a fragmentary detail section taken on line 5—5 of Fig. 4, with the operation illustrated in dotted lines.

As shown in the drawings, the mechanisms are mounted in a frame, which consists of the side sills 1, connected at one of their ends by an end sill 2, extending from which to substantially the middle of said side sills and fastened thereon is a floor 3. Extending upwardly from each of said side sills 1, and inclined thereto, are parallel side walls 4, which are braced at the ends of said side sills by members 5, over which a discharge floor 6, is laid.

Mounted above the floor 3, between the side sills 1, are rolls 7 and 8, respectively, and trained therearound is a conveyer belt 9, provided with outstanding fingers 10. Another roll 11, is mounted between said side sills 1, adjacent said roll 8, and trained therearound and a roll 12, extending between the side walls 4, is a conveyer belt 13, which, owing to the disposition of said rolls 11 and 12, is inclined with respect to the conveyer 9. A resilient sheet metal apron 14, provided with slots 15, is mounted above said conveyer 9, with the fingers 10, thereon, projecting and traveling through said slots 15. At one of its ends said apron is provided with short slots 16, between said slots 15, through which adjustable clamping screws 17, extend into the end sill 2, to hold said apron rigidly but releasably attached to the frame at this point. Connected at the other end of said apron 14, on the under surface thereof, are resilient supporting members 18, which curve downwardly and rest slidably upon said floor 3, adapting the apron to yield various amounts to adjust itself to different conditions of loading, as shown in dotted lines in Fig. 5. Hingedly connected to the end of said apron 14, is a short apron section 19, which, at each of its ends, is provided with upwardly angled contact feet 20, to normally rest on said elevating belt 13, near the margin thereof, so that said associated apron members are partly supported upon the elevating mechanism and partly upon said resilient members 18. It is thus readily apparent that the end of the apron 14, and the small section 19, serve to bridge the gap between the conveying and elevating mechanisms, so that the material delivered upon the apron 14, is moved along by the fingers 10, and into the field of operation of the elevating conveyer belt 13. Another conveying or elevating mechanism is provided to co-act with and assist said belt 13, in elevating the material to a point of discharge, and for this purpose the respective rolls 21 and 22, are mounted between said side walls 4, with a conveyer belt 23, trained thereabout. The lower run of said belt is substantially parallel to and above the upper run of the elevating belt 3, so that the material handled is contacted both from above and below and moved upwardly between said respective belts 13 and 23, toward discharge.

Mounted adjacent the upper roll 12, for the belt 13, is an idler roll 24, over which the material is delivered to the discharge floor 6, leading to the binding mechanism.

The operation is as follows: The material to be operated upon by the harvesting machine is delivered upon the apron 14, at which time the fingers 10, projecting therethrough from the conveyer belt moving therebeneath, transfer the material along the apron 14, discharging the same into a position whereby the material is picked up by the elevating belt 13. It is of particular note that the end of said apron 14, with the hinged section 19, is resiliently supported upon the members 18, so that in the event of a surplus quantity of material collecting thereon or any other conditions tending to jam the material, the apron may move to adjust itself to the conditions imposed without causing damage to the material or a delay in the operation of the machine. Owing to the fact that the space between the conveying belt 9, and the elevating belt 13, is bridged by the end of the apron 14, and the short hingedly connected section 19, none of the material is lost in the transfer between said respective conveying and elevating mechanisms, and should the heads be broken off or the grain shelled from the material it collects upon the aprons and is finally swept up on the elevating belt and delivered with the rest of the material to the point of discharge.

In the mechanisms now in general use, in order to improve the efficiency of operation thereof, I need only to substitute a conveyer belt 9, provided with fingers 10, or adapt the fingers 10, to the conveyer belt already in use, and place thereover the releasably mounted and resiliently supported slotted apron 14, together with its hinged section 19, which, together with the end of said apron 15, serves to bridge the gap between the conveying and elevating mechanisms.

I am aware that various details of construction may be varied through a wide range without departing from the principles of this invention. I therefore do not purpose limiting the patent granted otherwise than necessitated by the prior art.

I claim as my invention:

1. In a device of the class described the combination with conveying mechanism and a plurality of elevating mechanisms mounted adjacent one another to elevate material therebetween, of a sectional hingedly connected apron releasably and resiliently mounted above said conveying mechanism and bridging the gap between said conveying and elevating mechanisms to prevent the loss of material therebetween.

2. In a device of the class described the combination with conveying and elevating mechanisms, of an apron bridging the space between said conveying and elevating mechanisms and with a section hingedly connected to said apron and supported upon said elevating mechanism, said apron and section acting to prevent the loss of material handled between said respective conveying and elevating mechanisms.

3. In a device of the class described the combination with conveying and elevating mechanisms, of an apron releasably mounted and resiliently supported over said conveying mechanism and a section hingedly connected thereto co-acting therewith to bridge the gap between said conveying and elevating mechanisms and partly supported upon said elevating mechanism to prevent loss of material between said conveying and elevating mechanisms.

4. In a device of the class described the combination with a conveying mechanism, of a plurality of elevating mechanisms, and hingedly connected sectional means resiliently and detachably supported above said conveyer to bridge the space between said conveying and elevating mechanisms to prevent loss of material handled therebetween.

5. In a device of the class described the combination with a conveying and a plurality of elevating mechanisms, of a resilient support adjustably mounted between said conveying and elevating mechanisms, and a section hingedly connected to said support and partly supported upon portions of said elevating mechanism to prevent loss of material handled between said conveying and elevating mechanisms.

6. In a device of the class described the combination with a conveying mechanism, of a slotted apron mounted thereabove, fingers on the conveying mechanism extending through said slotted apron adapted to move material therealong, elevating mechanisms, a resilient support for the end of said apron between said conveying and elevating mechanisms, and a short section hingedly connected to said end of said apron and bearing upon one of said elevating mechanisms adapting the material to be discharged thereover onto said elevating mechanism.

7. In a device of the class described conveying and elevating mechanisms, and hingedly connected apron sections bridging the space between said mechanisms adapting the conveying mechanism to feed material onto said elevating mechanism.

8. In a device of the class described a conveying mechanism, a supporting apron mounted thereover adapting material received thereon to be moved by said conveying mechanism, a section hingedly connected to the end of said supporting apron, and elevating mechanism to receive the material discharged from said hingedly connected apron to elevate and discharge the same, said hingedly connected section partly supported upon said elevating mechanism.

9. In a device of the class described the combination of a horizontal conveyer, a plurality of oblique parallel elevators, a slotted apron over said conveyer, a short apron section hingedly connected to said apron and adapted to bridge the space between said conveyer and said elevators, said apron section resting on the lower elevator, and resilient adjustable supporting members connected underneath said apron and slidably resting on the floor between said conveyer and said elevators.

In testimony whereof I have hereunto subscribed my name in the presence of two subscribing witnesses.

GEORGE R. STRICKLAND.

Witnesses:
CHARLES W. HILLS, Jr.,
FRANK K. HUDSON.